(12) United States Patent
Kneezel

(10) Patent No.: US 7,537,327 B2
(45) Date of Patent: *May 26, 2009

(54) INTERNAL DIE FILTERS WITH MULTIPLE PASSAGEWAYS WHICH ARE FLUIDICALLY IN PARALLEL

(75) Inventor: Gary A. Kneezel, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 342 days.

This patent is subject to a terminal disclaimer.

(21) Appl. No.: 11/605,446

(22) Filed: Nov. 29, 2006

(65) Prior Publication Data

US 2007/0068866 A1    Mar. 29, 2007

Related U.S. Application Data

(62) Division of application No. 10/707,535, filed on Dec. 19, 2003, now Pat. No. 7,172,076.

(51) Int. Cl.
*B01D 27/04*    (2006.01)
*B01D 29/19*    (2006.01)
*B41J 2/01*    (2006.01)

(52) U.S. Cl. .................... 347/93; 210/498; 210/510.1; 210/321.84; 210/321.75; 210/488; 210/490; 210/499

(58) Field of Classification Search ............... 210/498
See application file for complete search history.

(56) References Cited

U.S. PATENT DOCUMENTS

| 4,639,798 A | 1/1987 | Harrison et al. |
| 5,114,581 A | 5/1992 | Goldsmith et al. |

*Primary Examiner*—Krishnan S Menon
(74) *Attorney, Agent, or Firm*—Oliff & Berridge, PLC

(57) ABSTRACT

An internal filter includes a lower substrate and an upper substrate. Fluid passages are formed by etching grooves into the surface(s) of the upper and/or lower substrates and/or in one or more intermediate layers. The filter pores extending between the fluid passages are formed by etching second grooves that fluidly connect the fluid passages. Two or more sets of the one or two intermediate layers can be implemented to provide additional filter passages and/or pores. Each set can be connected to a separate fluid source and/or a separate microfluidic device. In another internal filter, the inlet and outlet passages and the filter pores are formed on the same upper or lower substrate. The inlet and outlet passages are partially formed in a first step. In a second step, the inlet and outlet passages are completed at the same time that the filter pores are formed.

20 Claims, 9 Drawing Sheets

INTERNAL DIE FILTERS WITH MULTIPLE PASSAGEWAYS WHICH ARE FLUIDICALLY IN PARALLEL

This is a Division of Application No. 10/707,535 filed Dec. 19, 2003, now U.S. Pat. No. 7,172,076. The disclosure of the prior application is hereby incorporated by reference herein in its entirety.

BACKGROUND OF THE INVENTION

1. Field of Invention

This invention relates to systems and methods for fabricating internal die filters.

2. Description of Related Art

In a wide range of fluid processing applications, including those in the printing, medical, chemical, biochemical, genetic, automotive and energy fields, it is necessary to separate particles out of the fluid. For example, foreign particles or internally-generated particles may interfere with the subsequent intended use of the fluid, by potentially obstructing a small fluidic passageway in a critical region. Alternatively, the particles generated in the process may be a desired product. Consequently, it is necessary or desirable to capture such particles.

In particular, there is a class of devices, called microfluidic devices, in which a fluid enters the device and is then processed in some way by the device. Such microfluidic devices typically have an inlet for the fluid, a fluid processing region, and small fluidic passageways which bring the fluid from the inlet to the fluid processing region, and optionally, from the processing region to an outlet.

In some applications, a filter is fabricated which is internal to the microfluidic device. Such an internal filter is used in addition to or instead of an external filter. An advantage of the internal filter is that it may be placed immediately adjacent to the fluid processing region, either upstream of or downstream of the fluid processing region. Placing the internal filter in such upstream locations catches unwanted particles which might pass through the external filter, if used, as well as particles which developed downstream of the external filter to the device. A challenge for the internal filter is to form many fluidically parallel filter pore passageways so that fluid can be processed with high throughput and all necessary particles caught without causing too high a fluid impedance as the filter loads up with particles.

U.S. Pat. No. 4,639,748 to Drake et al, which is incorporated herein by reference in its entirety, discloses one exemplary embodiment of a particular fabrication method for an internal filter with fluidically parallel filter pores usable in a thermal inkjet printhead. The method disclosed in the 748 patent uses a sequence of anisotropic, isotropic, and anisotropic chemical etches in a silicon wafer to form the major fluid passageways within the device, as well as to form the filter pores.

SUMMARY OF THE INVENTION

One limitation of the fabrication process described in the incorporated 748 patent is that the material of the device surrounding the fluid passageways and filter pores needs to be single crystal silicon or other material compatible with orientation-dependent chemical etching. This process dictates that 1) the fluid passageways must be straight when seen from the etched surface, 2) each individual fluid passageway must be uniform along its length, 3) intersecting fluid passageways must be at right angles to each other, and 4) the fluid passageways must be substantially triangular in cross-section.

A second limitation of the fabrication process described in the incorporated 748 patent is that the some of the chemical etch steps need to be carefully controlled in terms of bath composition, temperature, and/or duration, in order to prevent overetching or underetching of the critical features.

This invention provides systems and methods that eliminate one or more of the limitations of the incorporated 748 patent.

This invention separately provides systems, methods and materials that do not require tight process control methods and materials that are less expensive.

This invention separately provides systems and methods that eliminate one or more of the geometric limitations of the incorporated 748 patent.

This invention separately provides internal filter as having many fluidically parallel filter pore passageways.

This invention separately provides an internal filter that has multiple stages of filtering within the microfluidic device.

This invention separately provides an internal filter that can be provided in downstream locations relative to a fluid processing region or device.

In various exemplary embodiments, an internal filter according to this invention includes a lower substrate, an upper substrate and two intermediate layers. Fluid passages are formed by etching (or the like) through the thickness of a first one of the intermediate layers. The filter pores extending between the fluid passages are formed by etching (or the like) through the thickness of the second one of the two intermediate layers. In various exemplary embodiments, two or more sets of the two intermediate layers can be implemented to provide additional filter passages and/or pores.

In various other exemplary embodiments, an internal filter according to this invention includes a lower substrate and an upper substrate. Both the inlet and outlet passages and the filter pores are formed on the same upper or lower substrate. In these exemplary embodiments, the inlet and outlet passages are partially formed in a first step. Then, in a second step, the inlet and outlet passages are completed at the same time that the filter pores are formed.

In various other exemplary embodiments, discrete internal filters can each be connected to a separate fluid source and/or a separate microfluidic device or the like. In various other exemplary embodiments, two or more internal filters can be connected in series. In these exemplary embodiments, the outlet side passage of an upstream internal filter is the inlet side passage for a downstream internal filter. In various exemplary embodiments, one or more of the above-described internal filters can be provided at each of one or more locations downstream of a fluid processing region or device. Placing the internal filter downstream of the fluid processing region catches wanted or unwanted particles which are generated in the fluid processing region or device.

These and other features and advantages of this invention are described in, or are apparent from, the following detailed description of various exemplary embodiments of the systems and methods according to this invention.

BRIEF DESCRIPTION OF THE DRAWINGS

Various exemplary embodiments of this invention will be described in detail, with reference to the following figures, wherein.

DETAILED DESCRIPTION OF EXEMPLARY EMBODIMENTS

Figure 1:
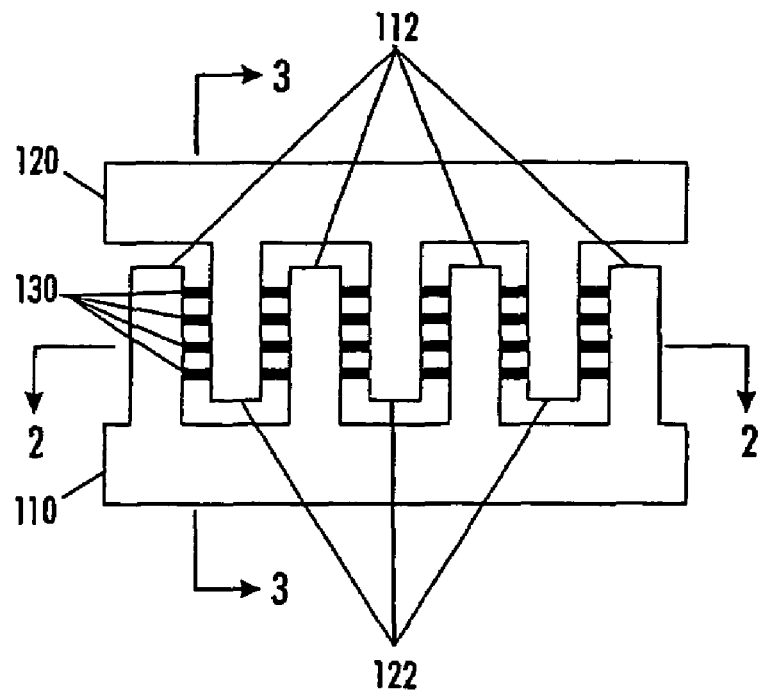
FIG. 1 is a top plan view of various exemplary embodiments of an internal filter with interleaved comb fluid pathways connected by multiple sets of filter pores in accordance with this invention.

FIG. 1 is a top plan view of a first exemplary embodiment of an internal filter 100 having interleaved comb fluid pathways 110 and 120 connected by multiple sets of filter pores 130 in accordance with this invention. As shown in FIG. 1, the inlet side passageway 110 has a plurality of extensions 112 that are configured in a comb pattern and may be placed, for example, near the fluid inlet to the microfluidic device. The outlet side passageway 120 has a plurality of extensions 122 that are also configured in a comb pattern. The fluid passes from the extensions 112 of the inlet side passageway 110 to the extensions 122 of the outlet side passageway 120 through the filter pores 130.

The fluid in the outlet side passageway 120 has a substantial number of particles removed relative to the fluid in the inlet side passageway 110. The removed particles are those of a size and shape such that cannot pass through the filter pores 130. The fluid may then pass from the outlet side passageway 120 to the fluid processing region of the microfluidic device. It should be appreciated that, when particles are generated in the fluid processing region of the microfluidic device, the internal filter is fabricated downstream of the fluid processing region. In this case, the fluid coming from the processing region would enter the inlet side passageway 110 and the particles would be trapped in the filter pores 130, with the fluid proceeding to the outlet side passageway 120.

Figure 2:
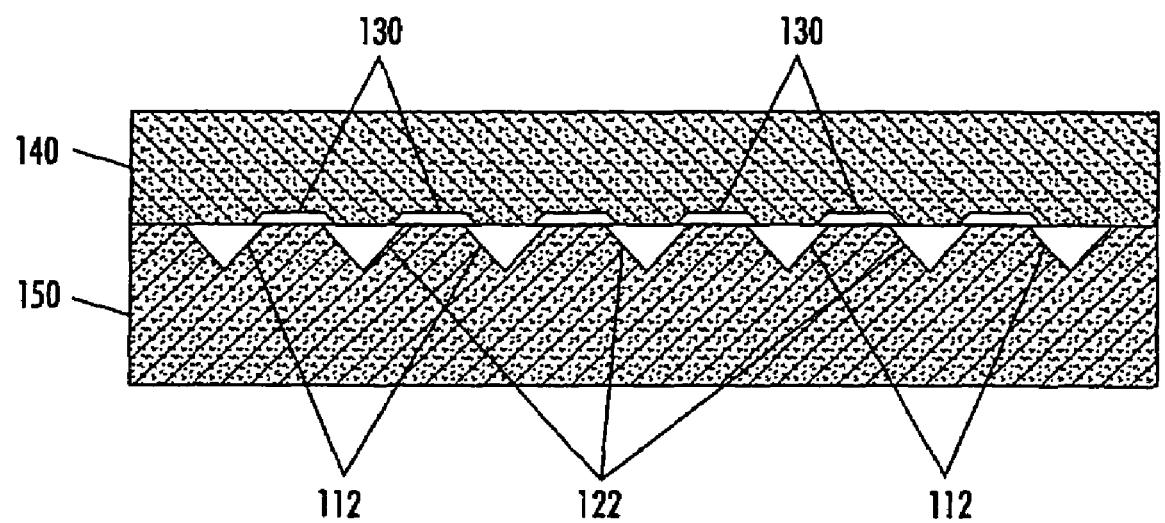
FIG. 2 is a first cross-sectional view of a first exemplary embodiment of the internal filter shown in FIG. 1.
Figure 3:
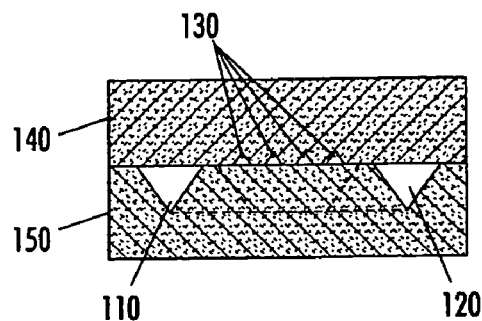
FIG. 3 is a second cross-sectional view of the first exemplary embodiment of the internal filter shown in FIG. 2.

FIG. 2 is a first cross-sectional view of a first exemplary embodiment of the internal filter shown in FIG. 1. FIGS. 2 and 3 show the pores 130 made in an upper substrate while the major passages are made in a lower substrate. This cross-sectional view is taken along the line II-II shown in FIG. 1. As shown in FIG. 2, the filter pores 130 are etched into a single upper substrate 140, which is made of crystal silicon or other material compatible with orientation-dependent chemical etching. As shown in FIG. 2, the extensions 112 of the inlet side passageways 110 and the extensions 122 of the outlet side passageways 120 are etched into a single lower substrate 150, which is made of crystal silicon or other material compatible with orientation-dependent chemical etching. As shown in FIG. 2, the fluid passes from the wider extensions 112 of the inlet side passageways 110 through the narrower filter pores 130 and into the wider extensions 122 of the outlet side passageways 120.

FIG. 3 is a second cross-sectional view of the first exemplary embodiment of the internal filter shown in FIG. 1. This cross-sectional view is taken along the line III-III of FIG. 1. The triangular shape of the channels 110, 112, 120, 122 and 130 resulting from the orientation-dependent etching process can be seen in the cross section of the inlet side passageways 110 and the outlet side passageways 120 and of the filter pores 130 shown in FIG. 3. The triangular shape of the extensions 112 and 122 can be seen in FIG. 2. The inlet side passageways 110, the outlet side passageways 120 and the extensions 112 and 122 are deeper and wider than the filter pores 130 in order to minimize fluid impedance, while still having filter pores 130 that are small enough to catch small particles.

Figure 4:
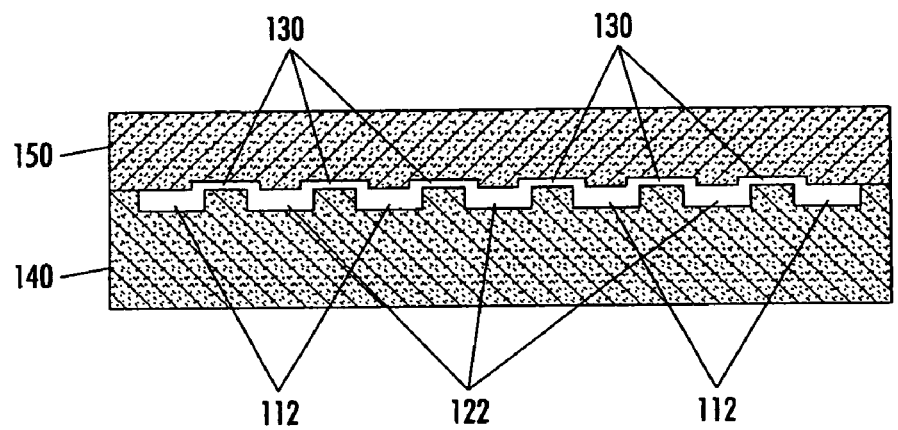
FIG. 4 is a first cross-sectional view of a second exemplary embodiment of an internal filter corresponding to the top plan view shown in FIG. 1.
Figure 5:
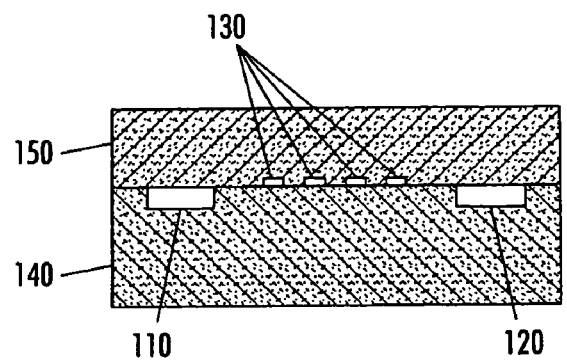
FIG. 5 is a second cross-sectional view of the second exemplary embodiment of the internal filter shown in FIG. 4.

FIG. 4 is a first cross-sectional view of a second exemplary embodiment of the internal filter shown in FIG. 1. This cross-sectional view is taken along the line II-II shown in FIG. 1. In contrast, FIG. 5 is a second cross-sectional view of the second exemplary embodiment of the internal filter shown in FIG. 1. This cross-section view is taken along the line III-III shown in FIG. 1 As shown in FIGS. 4 and 5, in this exemplary embodiment, the substrates 140 and 150 are masked to expose regions corresponding to the inlet and outlet side passages 110 and 120, and the filter pores 130, respectively. The substrates 140 and 150 are then reactive ion etched or the like to form the inlet side passages 110 and the outlet side passages 120, and the filter pores 130, respectively.

Figure 6:
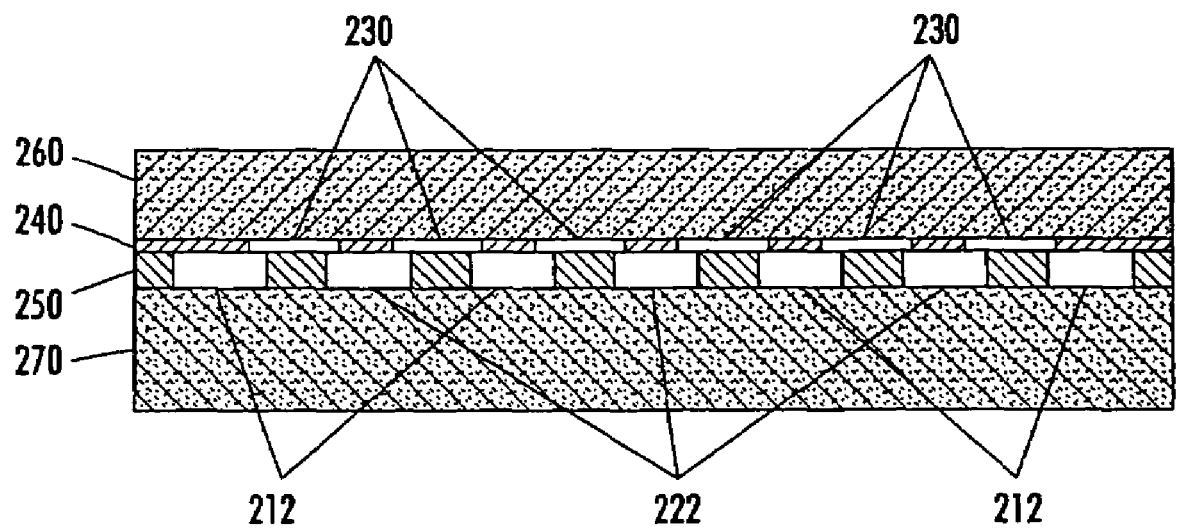
FIG. 6 is a first cross-sectional view of a third exemplary embodiment of an internal filter corresponding to the top plan view shown in FIG. 1.
Figure 7:
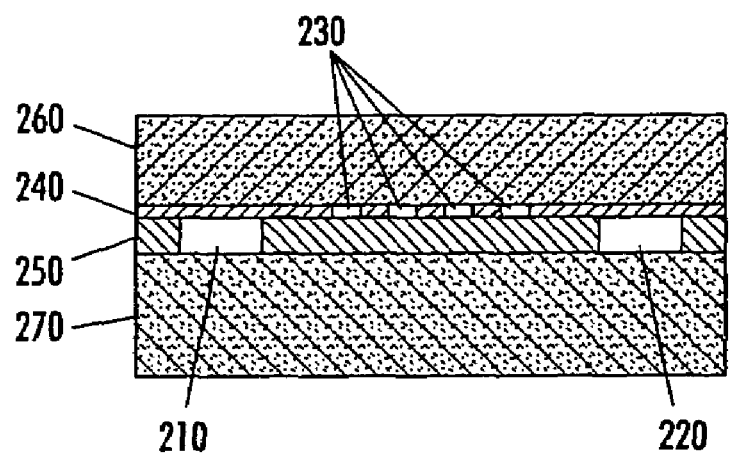
FIG. 7 is a second cross-sectional view of the third exemplary embodiment of the internal filter shown in FIG. 6.

FIG. 6 is a first cross-sectional view of a third exemplary embodiment of the internal filter shown in FIG. 1. This cross-sectional view is taken along the line II-II shown in FIG. 1. In contrast, FIG. 7 is a second cross-sectional view of the third exemplary embodiment of the internal filter shown in FIG. 1. This cross-section view is taken along the line III-III shown in FIG. 1. It should be appreciated that, in various exemplary embodiments, the internal filter 200 shown in FIGS. 6 and 7 was manufactured by exposing and developing one or more photosensitive materials, such as polymide, SU-8, polyarylene ether, and the like. As shown in FIG. 6, the filter pores 230 are formed in an upper layer 240, while the inlet side passageway 210 and extensions 212 and the outlet side passageway 220 and extensions 222 are formed in a lower layer 250. The upper and lower layers 240 and 250 are separate from each other. The upper and lower layers 240 and 250 are then bonded together and to each of an upper substrate 260 and a lower substrate 270.

The processes used to expose and develop the photosensitive materials, and thus to form the structures shown in FIGS. 2-7, are easier to control than the similar processes used in the incorporated 748 patent. Orientation-dependent etching of silicon in a single substrate, such as in FIGS. 2 and 3, is self terminating and essentially stops when the etch planes intersect at a point. This is why the cross-section is triangular. The reactive ion etching process used to form the structures shown in FIGS. 4 and 5 etches at a relatively slow rate that does not depend on the crystal planes of the substrate. As a result, the depth and shape of the etched structures can be more easily controlled. Furthermore, the processes used to form the structures shown in FIGS. 6 and 7 are easy to use and control because the passages formed in each layer are formed through the whole layer. Therefore, passage depth does not need to be controlled. Also, the processes for exposing and developing photosensitive materials do not limit the internal filter to geometries with only two layers of passages.

Figure 8:
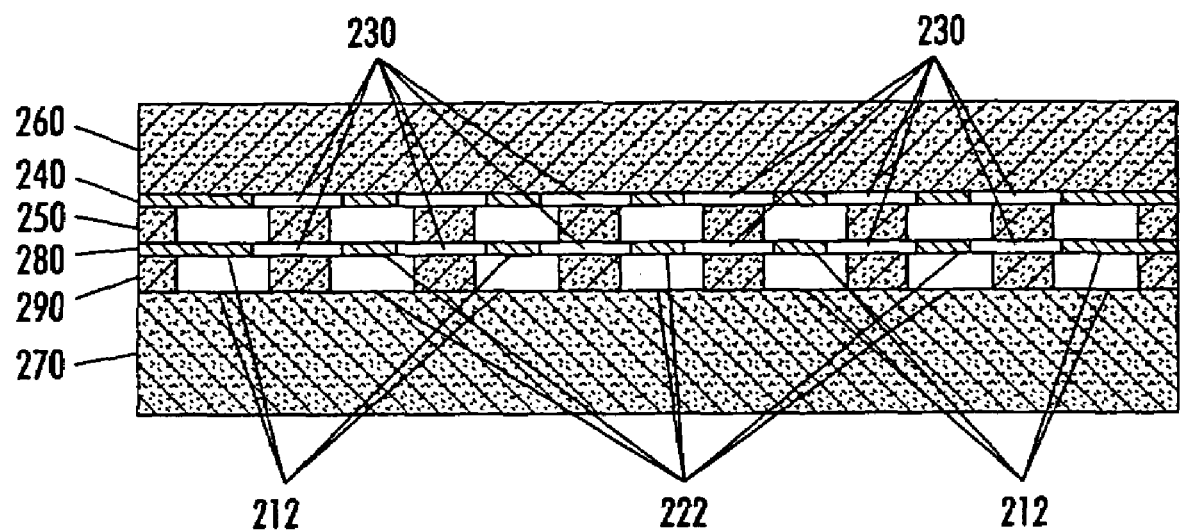
FIG. 8 is a first cross-sectional view of a fourth exemplary embodiment of an internal filter corresponding to the top plan view shown in FIG. 1.
Figure 9:
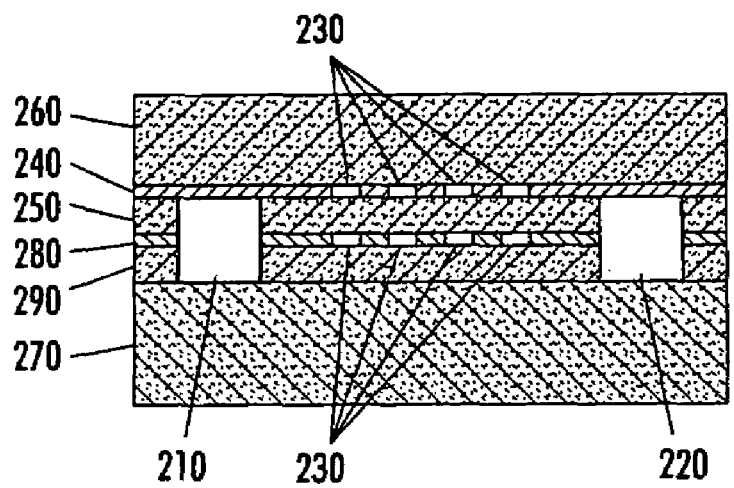
FIG. 9 is a second cross-sectional view of the fourth exemplary embodiment of the internal filter shown in FIG. 8.

FIG. 8 is a first cross-sectional view of a fourth exemplary embodiment of the internal filter shown in FIG. 1 according to this invention. This cross-sectional view is also taken along the line II-II shown in FIG. 1. In contrast, FIG. 9 is a second cross-sectional view of the fourth exemplary embodiment the internal filter shown in FIG. 1. This cross-section view is also taken along the line III-III shown in FIG. 1. As shown in FIGS. 8 and 9, in addition to the upper layer 240 and the lower layer 250 shown in FIGS. 6 and 7, an additional filter pore layer 280 and an additional inlet and outlet passageway layer 290 is added. This doubles the number of filter pores in parallel with relatively little increase in space used in the device.

In various other exemplary embodiments, methods for fabricating fifth and sixth exemplary embodiment of the internal filter with interleaved comb fluid pathways connected by multiple sets of filter pores according to this invention do not etch into top and bottom substrates, as in the first and second embodiments, nor do they etch completely through the upper and lower layers 240 and 250, as in the fifth and sixth exemplary embodiments. In fact, the upper and lower layers 240 and 250 are not even used in this third exemplary embodiment. Rather, these exemplary embodiments of the methods for fabricating the fifth and sixth exemplary embodiments of the internal filter use orientation-dependent etching, reactive ion etching and/or some other appropriate technique.

Figure 10:
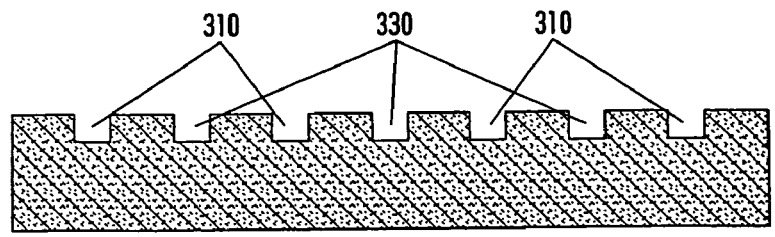
FIGS. 10 and 11 illustrate a substrate processed according to a first step of one exemplary embodiment of a method for making a fifth exemplary embodiment of an internal filter according to this invention.
Figure 11:
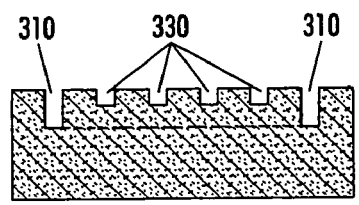

Using reactive ion etching and/or some other appropriate technique, passages of different widths and depths can be obtained in a single substrate by using multiple steps. FIGS. 10 and 11 illustrate a substrate processed according to a first step of one exemplary embodiment of the method for making the fifth exemplary embodiment of the internal filter according to this invention. In particular, FIG. 10 shows the substrate when taken on a view corresponding to the line II-II of FIG. 1, while FIG. 11 corresponds to a view taken along the line III-III shown in FIG. 1.

As shown in FIGS. 10 and 11, in this first step of this exemplary embodiment of the method for forming the fifth exemplary embodiment of the internal filter, the substrate 300 is masked to expose regions corresponding to the inlet and outlet side passages 320 and 330. The substrate 330 is then reactive ion etched or the like to begin forming the inlet side passages 310 and the outlet side passages 320. In particular, it should be appreciated that, after this first step, as shown in FIG. 10, the inlet side passages 310 and the outlet side passages 320 are only partially formed.

Figure 12:
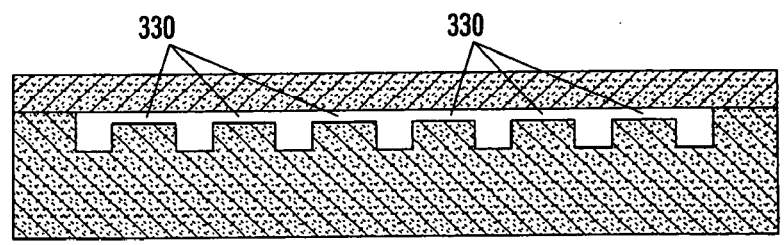
FIGS. 12 and 13 illustrate a second step of one exemplary embodiment of the method for forming the fifth exemplary embodiment of the internal filter according to this invention.
Figure 13:
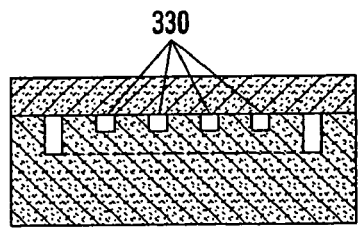

The regions of the substrate 300 corresponding to the filter pores 330 are then exposed by removing corresponding portions of the mask. A second reactive ion etching or the like step is used to form the filter pores 330 and to deepen the inlet side passageways 310 and the outlet side passageways 320. In particular, FIG. 12 shows the substrate 330 and an upper substrate 340 after this second step when taken on a view corresponding to the line II-II of FIG. 1. Similarly, FIG. 13 shows the substrate 300 and the upper substrate 340 after this second step when taken of a view corresponding to the line III-III of FIG. 1. That is, FIGS. 12 and 13 show the substrate 330 after the second reactive ion etching step is performed and the upper substrate 340 is bonded in place. It should be appreciated that plasma, deep silicon or other types of etching can also be used to perform the method for fabricating the third exemplary embodiment of the internal filter according to this invention.

Figure 14:
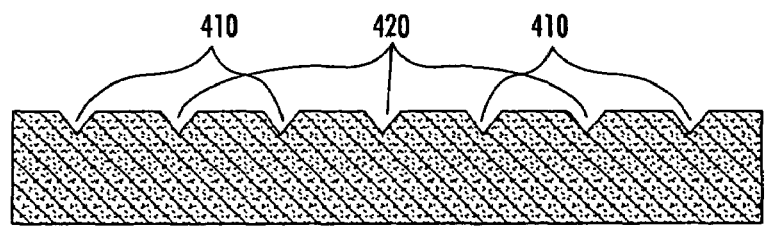
FIGS. 14 and 15 illustrate a substrate processed according to a first step of one exemplary embodiment of a method for making a sixth exemplary embodiment of an internal filter according to this invention.
Figure 15:
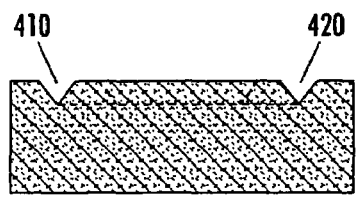

Using orientation-dependent etching and/or some other appropriate technique, passages of different widths and depths can be obtained in a single substrate by using multiple steps. FIGS. 14 and 15 illustrate a substrate processed according to a first step of one exemplary embodiment of the method for making the sixth exemplary embodiment of the internal filter according to this invention. In particular, FIG. 14 shows the substrate when taken on a view corresponding to the line II-II of FIG. 1, while FIG. 15 corresponds to a view taken along the line III-III shown in FIG. 1.

As shown in FIGS. 14 and 15, in this first step of this exemplary embodiment of the method for forming the fifth exemplary embodiment of the internal filter, the substrate 400 is masked to expose regions corresponding to the inlet and outlet side passages 420 and 430. The substrate 430 is then orientation-dependent etched or the like to begin forming the inlet side passages 410 and the outlet side passages 420. In particular, it should be appreciated that, after this first step, as shown in FIG. 14, the inlet side passages 410 and the outlet side passages 420 are only partially formed.

Figure 16:
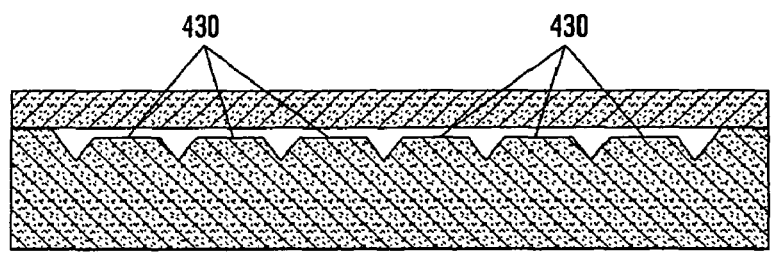
FIGS. 16 and 17 illustrate a second step of one exemplary embodiment of the method for forming the sixth exemplary embodiment of the internal filter according to this invention.
Figure 17:
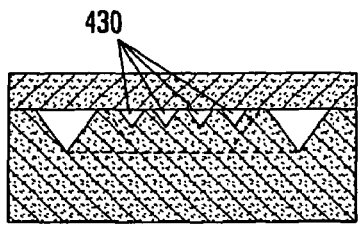

The regions of the substrate 400 corresponding to the filter pores 430 are then exposed by removing corresponding portions of the mask. A second orientation-dependent etching or the like step is used to form the filter pores 430 and to deepen the inlet side passageways 410 and the outlet side passageways 420. In particular, FIG. 16 shows the substrate 400 and an upper substrate 340 after this second step when taken on a view corresponding to the line II-II of FIG. 1. Similarly, FIG. 17 shows the substrate 400 and the upper substrate 440 after this second step when taken of a view corresponding to the line III-III of FIG. 1. That is, FIGS. 16 and 17 show the substrate 400 after the second orientation-dependent etching step is performed and the upper substrate 440 is bonded in place.

Figure 18:
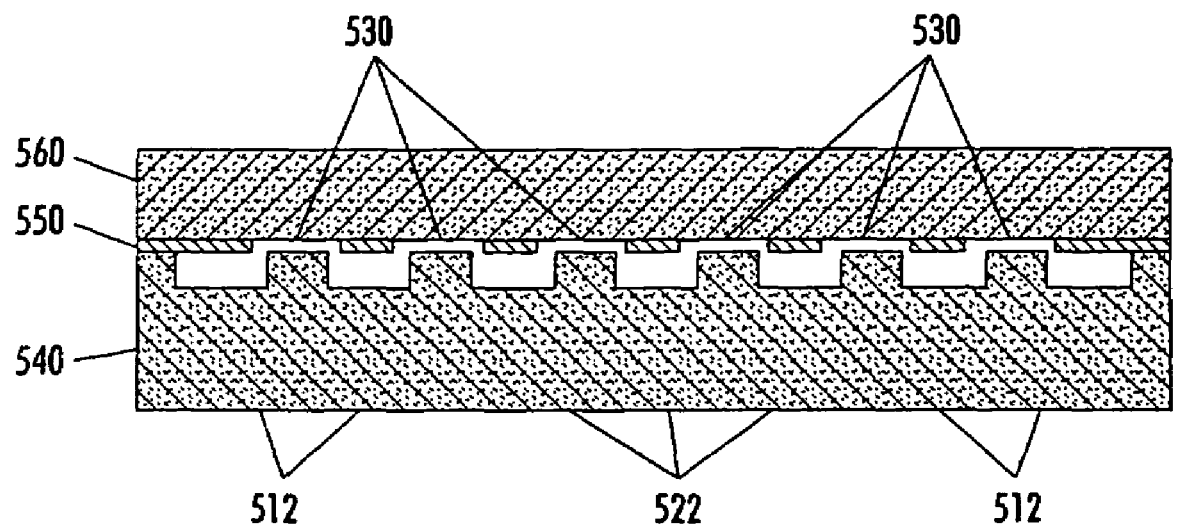
FIG. 18 is a first cross-sectional view of a seventh exemplary embodiment of an internal filter corresponding to the top plan view shown in FIG. 1.
Figure 19:
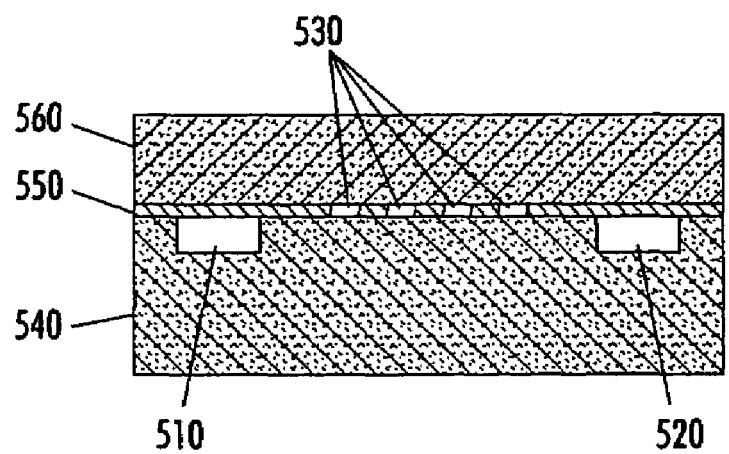
FIG. 19 is a second cross-sectional view of the seventh exemplary embodiment of the internal filter shown in FIG. 18.

FIG. 18 is a first cross-sectional view of a seventh exemplary embodiment of the internal filter shown in FIG. 1. This cross-sectional view is taken along the line II-II shown in FIG. 1. In contrast, FIG. 19 is a second cross-sectional view of the seventh exemplary embodiment of the internal filter shown in FIG. 1. This cross-section view is taken along the line III-III shown in FIG. 1. It should be appreciated that, in various exemplary embodiments, the internal filter 500 shown in FIGS. 18 and 19 was manufactured by reactive ion etching or the like a substrate 540 and by additionally exposing and developing one or more photosensitive materials, such as polymide, SU-8, polyarylene ether, and the like, used to form an intermediate layer 550.

As shown in FIGS. 18 and 19, the filter pores 530 are formed in an intermediate layer 550 and the inlet side passageway 510 and extensions 512 and the outlet side passageway 520 and extensions 522 are formed in the lower substrate 540. The intermediate layer 550 is separate from the lower and upper substrates 540 and 560. The substrate 550 is then bonded to each of the upper substrate 560 and the lower substrate 540. Of course, it should be appreciated that, the upper and lower substrates are so only in FIGS. 18 and 19. In use, the lower substrate 540 can be above the upper substrate 560 and the intermediate layer 550.

Figure 20:
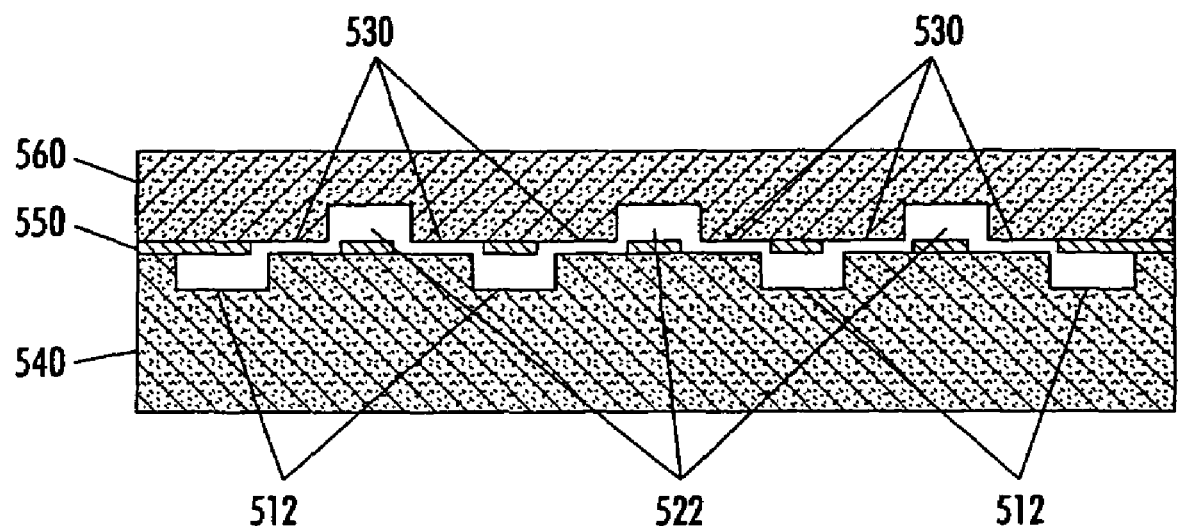
FIG. 20 is a first cross-sectional view of a variation of the seventh exemplary embodiment of an internal filter corresponding to the top plan view shown in FIG. 18.
Figure 21:
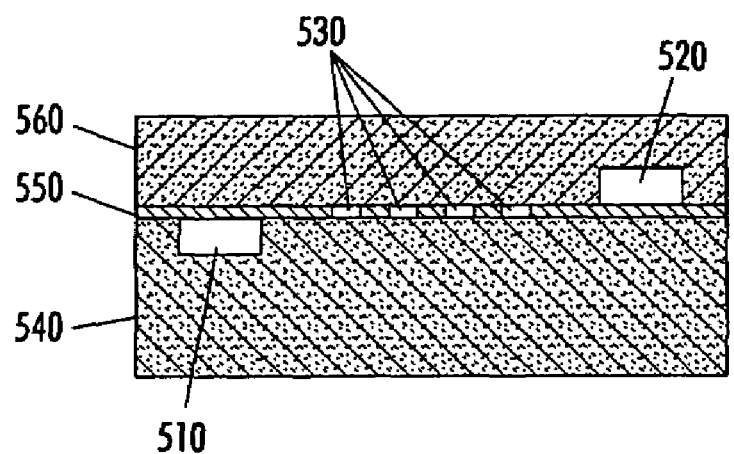
FIG. 21 is a second cross-sectional view of the variation of the seventh exemplary embodiment of the internal filter shown in FIG. 20.

FIG. 20 is a first cross-sectional view of a variation of the seventh exemplary embodiment of the internal filter shown in FIG. 18. This cross-sectional view is taken along the line II-II shown in FIG. 1. FIG. 21 is a second cross-sectional view of the variation of the seventh exemplary embodiment of the internal filter shown in FIG. 18. This cross-section view is taken along the line III-III shown in FIG. 1. It should be appreciated that, in various exemplary embodiments, the internal filter 500 shown in FIGS. 20 and 21 was manufactured by reactive ion etching or the like the substrate 540 and by additionally exposing and developing one or more photosensitive materials, such as polymide, SU-8, polyarylene ether, and the like, used to form the intermediate layer 550.

As shown in FIGS. 20 and 21, the filter pores 530 are formed in an intermediate layer 550 and the inlet side passageway 510 and extensions 512 are formed in the lower substrate 540. In contrast, the outlet side passageway 520 and extensions 522 are formed in the upper substrate 560. The intermediate layer 550 is separate from the lower and upper substrates 540 and 560. The substrate 550 is then bonded to each of the upper substrate 560 and the lower substrate 540. Of course, it should be appreciated that, the upper and lower substrates are so only in FIGS. 20 and 21. In use, the lower substrate 540 can be above the upper substrate 560 and the intermediate layer 550.

It should be appreciated that plasma etching, deep silicon etching, precision injection molding of plastic materials, coining, electroforming, air abrasive blasting, laser ablation or known or later-developed methods for fabricating the internal filter with interleaved comb fluid pathways connected by multiple sets of filter pores, shown in FIGS. 2-21 can be used, as appropriate, to form the first-third exemplary embodiments of the internal filter according to this invention.

It should also be appreciated that different fabrication methods can be used for different layers or substrates of the various exemplary embodiments of the internal filter according to this invention. For example, photosensitive material exposure and development processes can be used to fabricate the inlet side passageways and outlet side passageways in a separate layer, which is then bonded to a lower substrate, and the filter pores can be reactive ion etched into an upper substrate.

One limitation of the internal filter with interleaved comb fluid pathways connected by multiple sets of filter pores shown in FIG. 1 is that there is only one inlet side passageway 110 and only one outlet side passageway 120. This limits the types of fluids the device may handle simultaneously to one. There are many applications, such as color printing, where the internal filter needs to handle multiple sources or multiple fluid processing sites independently.

Figure 22:
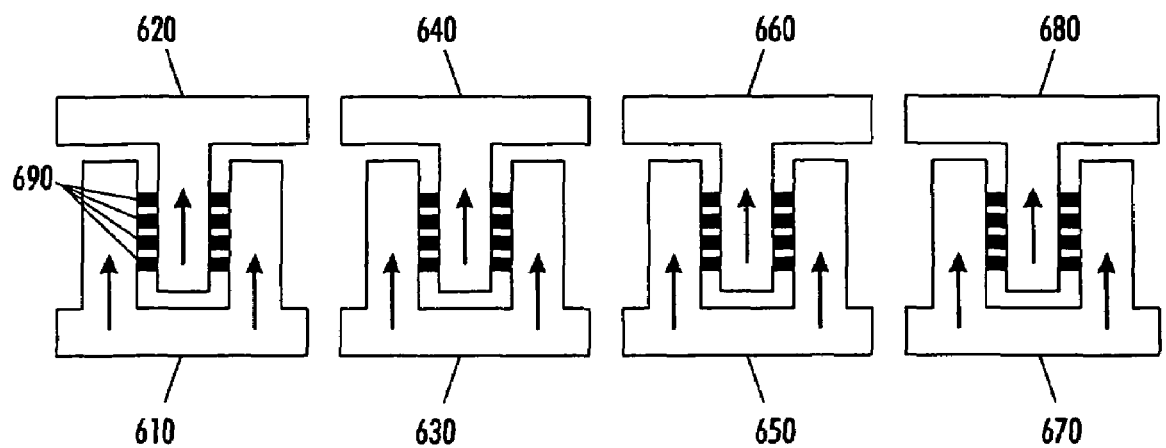
FIG. 22 is a top plan view illustrating an eighth exemplary embodiment of an internal filter according to this invention.

FIG. 22 shows an eighth exemplary embodiment of an internal filter with interleaved comb fluid pathways connected by multiple sets of filter pores according to this invention. As shown in FIG. 22, in this eighth exemplary embodiment, the multiple sets of filter pores are configured in alternate positions to support multiple independent fluid sources and/or multiple independent fluid sinks. As shown in FIG. 22, the inlet side passageway 610 and the outlet side passageway 620 are used for one type of fluid, for example, a yellow-colored ink. The other inlet side passages 630, 650 and 670, and the other outlet side passages 640, 660 and 680 are used for other types of fluid, for example, cyan-, magenta- and black-colored inks respectively. It should be appreciated that the internal filter can be fabricated so that the multiple independent fluid sources are connected to separate layers, instead of in the configuration shown in FIG. 22.

Of course, it should be appreciated that, in FIG. 22, in various exemplary embodiments, each of the inlet side passageways 610, 630, 650 and 670 could instead be connected to the same fluid source or upstream fluid processing device, while each of the outlet side passageways 620, 640, 660 and 680 is connected to a different fluid sink, such as a fluid collection device or a downstream fluid processing device. In this way, different filtered streams can be directed to different outlet side devices. If the filter pores 690 for each of the different sets of inlet and outlet side passageways 610-620, 630-640, 650-660 and 670-680 are differently sized so that different size particles are allowed to pass through the corresponding pores 690, the fluid streams output from the outlet side passageways 620, 640, 660 and 680 will have different sets of particles in the fluid and/or will have different fluid properties or parameters depending on which particles are filtered from that fluid. Accordingly, it should be appreciated that the plurality of inlet side passageways 610, 630, 650 and 670 can be different portions of a single inlet side passageway.

Of course, it should also be appreciated that, in FIG. 22, in various exemplary embodiments, each of the inlet side passageways 610, 630, 650 and 670 could be connected to a different fluid source or upstream fluid processing device, while each of the outlet side passageways 620, 640, 660 and 680 is connected to the same fluid sink, such as a fluid collection device or a downstream fluid processing device. In this way, different input streams can be combined before being forwarded to the same outlet side devices, with each different input stream being filtered in a manner appropriate for that input fluid stream. Accordingly, it should be appreciated that the plurality of outlet side passageways 620, 630, 660 and 680 can be different portions of a single outlet side passageway.

That is, if each different input fluid stream has particles that are different sizes, the filter pores 690 for each of the different sets of inlet and outlet side passageways 610-620, 630-640, 650-660 and 670-680 can be differently sized so that each different input fluid stream is appropriately filtered. In this way, particles of the same size in different input streams can be differently filtered, such that particles of a given size that need to be removed from one input fluid stream can be removed, while particles of that given size of a different input fluid stream that need to be allowed to pass through to the outlet stream are not filtered from that input fluid stream. If the fluid were filtered after being combined, this differential filtering would not be possible.

The variation of the seventh exemplary embodiment that is shown in FIGS. 20 and 21 allows more freedom in placing the inlet and outlet side passageways 510 and 520 relative to each other. For example, instead of the position shown in FIG. 21, the outlet side passageway 520 could be placed vertically over the inlet side passageway 510. Furthermore, if this variation of the seventh exemplary embodiment were used with the eighth exemplary embodiment shown in FIG. 22, two or more inlet side passageways 510 could be provided in the lower substrate 540, with different ones of the first passages 512 connected to different ones of the two or more inlet side passageways 510. Similarly, two or more outlet side passageways 520 could be provided in the upper substrate 560, with different ones of the second passages 522 connected to different ones of the two or more outlet side passageways 520. In this case, some of the pores 530 could be omitted so that some first passages 512 are not connected to adjacent second passages 522. Consequently, two or more of the separate structures shown in FIG. 22 could be formed in an overlapping or interleaved manner in the same region of the internal filter.

Figure 23:
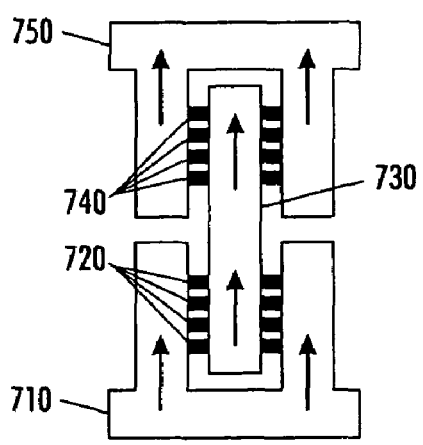
FIG. 23 is a top plan view illustrating a ninth exemplary embodiment of an internal filter according to this invention.

FIG. 23 illustrates a ninth exemplary embodiment of an internal filter with interleaved comb fluid pathways connected by multiple sets of filter pores, according to this invention. As shown in FIG. 23, in this ninth exemplary embodiment, the multiple sets of filter pores are configured in alternate positions to provide a second stage of filtering for particles of different sizes. As shown in FIG. 23, fluid enters through the inlet side passage 710, passes through the large filter pores 720 and into the center passage 730. The fluid then passes from the center passage 730 through a set of smaller filter pores 740 and into the outlet side passage 750. Smaller particles not trapped in the larger filter pores 720 are trapped in the smaller filter pores 740.

It should be appreciated that the filter locations shown in FIG. 23 can also be used to provide filtering before and after fluid processing which is performed in the center passage 730. Alternately, the center passage can be split into two portions with a fluid processing structure connected between the two portions of the center passage 730.

While particular embodiments have been described, alternatives, modifications, variations, improvements, and substantial equivalents that are or may be presently unforeseen may arise to applicants or others skilled in the art. Accordingly, the exemplary embodiments of the invention, as set forth above, are intended to be illustrative, not limiting. Various changes may be made without departing from the spirit and scope of the invention. Therefore, the appended claims as filed and as they may be amended are intended to embrace all such alternatives, modifications, variations, improvements, and substantial equivalents.

What is claimed is:

1. An internal liquid filter, comprising:
  a first substrate;
  a second substrate;
  a first layer and a second layer provided between the first and second substrates;
  a plurality of first and second passages provided in the first layer; and
  a plurality of third passages provided in the second layer, each third passage extending between and fluidly connected to one of the first passages and one of the second passages, wherein liquid can flow into the one of the first and second passages, from the one of the first and second passages into the third passages, and from the third passages into the other of the first and second passages, such that particles having a size greater than that which can pass through the third passages are filtered from the liquid, wherein
  the third passages are each bounded on one side by the second substrate, on two sides by the second layer, and on a fourth side by the first layer.

2. The internal liquid filter of claim 1, further comprising:
  at least one fourth passage, each fourth passage formed in the first layer and fluidly connected to at least one of the plurality of first passages; and
  at least one fifth passage, each fifth passage formed in the first layer and fluidly connected to at least one of the second passages.

3. The internal liquid filter of claim 2, wherein a microfluidic device is connected to one of the fourth and fifth passages.

4. The internal liquid filter of claim 2, wherein a liquid source is connected to one of the fourth and fifth passages.

5. A system comprising:
  a liquid source;
  a liquid sink; and
  the internal liquid filter of claim 2, wherein the liquid source is connected to one of the fourth and fifth passages and the liquid sink is connected to the other of the fourth and fifth passages.

6. The internal liquid filter of claim 1, further comprising:
  a third layer and a fourth layer provided between the first and second substrates;
  a second plurality of first and second passages provided in the third layer; and
  a second plurality of third passages provided in the fourth layer, each third passage of the second plurality of third passages extending between and fluidly connected to one of the second plurality of first passages and one of the second plurality of second passages, wherein liquid can flow into the one of the first and second passages, from the one of the first and second passages into the third passages, and from the third passages into the other of the first and second passages, such that particles having a size greater than that which can pass through the third passages are filtered from the liquid.

7. The internal liquid filter of claim 1, wherein the first and second layers form a first set of first and second layers, the internal liquid filter further comprising:
  a second set of first and second layers;
  additional first and second passages formed in the first layer of the second set of first and second layers; and
  additional third passages formed in the second layer of the second set of first and second layers, each of the additional third passages extending between and fluidly connected between one of the additional first and one of the additional second passages.

8. The internal liquid filter of claim 1, further comprising:
  at least one fourth passage, each fourth passage formed in the first layer and connected to at least one of a first subset of the first passages;
  at least one fifth passage, each fifth passage formed in the first layer and connected to at least one of a second subset of the first passages;
  wherein at least one second passage is fluidly connected by the third passages to at least one of the first subset of the first passages and at least one of the second subset of first passages.

9. The internal liquid filter of claim 8, wherein at least one second passage that is fluidly connected to at least one of the first subset of the first passages and at least one of the second subset of first passages comprises:
  a first portion fluidly connected to the at least one of the first subset of passages; and
  a second portion fluidly connected to the at least one of the second subset of passages;
  wherein a microfluidic device is connected to the first and second portions of the second passage.

10. An internal liquid filter, comprising:
a first substrate;
a second substrate;
an intermediate layer provided between the first and second substrates;
a plurality of first passages provided in the first substrate;
a plurality of second passages provided in one of the first and second substrates; and
a plurality of third passages provided in the intermediate layer, each third passage extending between and fluidly connected to one of the first passages and one of the second passages, wherein liquid can flow into the one of the first and second passages, from the one of the first and second passages into the third passages, and from the third passages into the other of the first and second passages, such that particles having a size greater than that which can pass through the third passages are filtered from the liquid, wherein
the third passages are each bounded on one side by the first substrate, on two sides by the intermediate layer, and on a fourth side by the second substrate.

11. The internal liquid filter of claim 10, further comprising:
at least one fourth passage, each at least one fourth passage fluidly connected to at least some of the plurality of first passages; and
at least one fifth passage, each at least one fifth passage fluidly connected to at least some of the plurality of second passages.

12. The internal liquid filter of claim 11, wherein a microfluidic device is connected to one of the at least one fourth passage and the at least one fifth passage.

13. The internal liquid filter of claim 11, wherein a fluid source is connected to one of the at least one fourth passage and the at least one fifth passage.

14. A system comprising:
a liquid source;
a liquid sink; and
the internal liquid filter of claim 11, wherein the liquid source is connected to a fourth passage or a fifth passage and the liquid sink is connected to the other of a fourth passage or a fifth passage.

15. The internal liquid filter of claim 10, further comprising:
a plurality of fourth passages, each fourth passage fluidly connected to at least one of the plurality of first passages; and
a plurality of fifth passages, each fifth passage fluidly connected to at least one of the second passages.

16. The internal liquid filter of claim 10, further comprising:
at least one fourth passage, each fourth passage connected to at least one of a first subset of the first passages;
at least one fifth passage, each fifth passage connected to at least one of a second subset of the first passages;
wherein at least one second passage is fluidly connected by the third passages to at least one of the first subset of the first passages and at least one of the second subset of first passages.

17. The internal liquid filter of claim 16, wherein at least one second passage that is fluidly connected to at least one of the first subset of the first passages and at least one of the second subset of first passages comprises:
a first portion fluidly connected to the at least one of the first subset of passages; and
a second portion fluidly connected to the at least one of the second subset of passages;
wherein a microfluidic device is connected to the first and second portions of the second passage.

18. An internal liquid filter, comprising:
a first passage;
a second passage;
a third passage;
a plurality of fourth passages, each fourth passage connected to the first passage;
a plurality of fifth passages, each fifth passage connected to the second passage; and
a plurality of sixth passages, each sixth passage extending between and fluidly connected to the third passage and one of the fourth passages and the fifth passages, wherein liquid can flow into one of the first and second passages, from the one of the first and second passages into one of the plurality of fourth passages and the plurality of fifth passages, respectively, from the one of the plurality of fourth passages and the plurality of fifth passages into the plurality of sixth passages, from the sixth passages into the third passage, from the third passage into the other of the plurality of fourth passages and the plurality of fifth passages, and from the other one of the plurality of fourth passages and the plurality of fifth passages into the other of the first and second passages, such that particles having a size greater than that which can pass through the sixth passages are filtered from the liquid.

19. The internal liquid filter of claim 18, wherein the third passage comprises:
a first portion fluidly connected by the sixth passages to the plurality of fourth passages; and
a second portion fluidly connected by the sixth passages to the plurality of fifth passages;
wherein a microfluidic device is connected between the first and second portions of the third passage.

20. The internal liquid filter of claim 18, wherein the first passage is connected to one of a liquid source and a liquid sink and the second passage is connected to the other of the liquid source and the liquid sink.

* * * * *